United States Patent [19]

Fujimoto et al.

[11] Patent Number: 5,070,841

[45] Date of Patent: Dec. 10, 1991

[54] IGNITION TIMING CONTROL SYSTEM FOR INTERNAL COMBUSTION ENGINE

[75] Inventors: Sachito Fujimoto; Ryuji Satoh; Akira Kato, all of Wako, Japan

[73] Assignee: Honda Giken Kogyo Kabushiki Kaisha, Tokyo, Japan

[21] Appl. No.: 580,679

[22] Filed: Sep. 11, 1990

[30] Foreign Application Priority Data

Sep. 12, 1989 [JP] Japan ............................. 1-107081[U]

[51] Int. Cl.$^5$ ............................................. F02P 5/15
[52] U.S. Cl. ................................................. 123/422
[58] Field of Search ........................ 123/422, 423, 418

[56] References Cited

U.S. PATENT DOCUMENTS

| | | | |
|---|---|---|---|
| 4,844,026 | 7/1989 | Tomisawa | 123/422 |
| 4,852,537 | 8/1989 | Nagano et al. | 123/422 X |
| 4,870,935 | 10/1989 | Araki | 123/422 |
| 4,887,573 | 12/1989 | Fujiwara et al. | 123/422 |
| 4,896,641 | 1/1990 | Nagano et al. | 123/422 |
| 4,909,224 | 3/1990 | Nishiyama et al. | 123/422 X |
| 4,987,874 | 1/1991 | Katayama et al. | 123/422 |

Primary Examiner—Tony M. Argenbright

Attorney, Agent, or Firm—Armstrong, Nikaido, Marmelstein, Kubovcik & Murray

[57] ABSTRACT

An ignition timing control system of the vehicle internal combustion engines which conducts ignition timing control retard adjustment during vehicle acceleration so as to eliminate vibration of the vehicle body caused by the sudden change in the engine output. When the vehicle acceleration is detected, the ignition timing is immediately retarded for a period and after the expiration of the period, the retard adjustment is continued so long as the engine speed increases and discontinued when the engine speed turns to decreases. As a result of the repeated ignition timing control, the overall ignition timing characteristics take on a zigzag pattern. The ignition timing is thus controlled to reduce the output torque when the torque tends to rise because the engine speed is rising, while the retard correction is discontinued so as to prevent a decrease in output torque when the engine output torque tends to decline. As such, by deliberately imparting a phase difference to the output, the change in the engine speed is averaged to result smooth rising during acceleration without causing the vibration to the vehicle body.

28 Claims, 9 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, and more particularly to an ignition timing system for vehicle internal combustion engines which conducts ignition timing retard control during acceleration so as to eliminate vibration of the vehicle body.

2. Description of the Prior Art

There have been proposed ignition timing control systems for vehicle internal combustion engines in which ignition timing is retarded during acceleration so as to prevent combustion knock. One example of such a system is described in Japanese Laid-open Patent Publication No. 57(1982)-99269. In this prior art system, when acceleration is detected, the ignition timing is retarded by a predetermined amount so as to avoid knocking.

While the aforesaid system retards the ignition timing for the purpose of preventing knocking during acceleration, there also arises another problem in a vehicle having a relatively highpowered engine with a manual transmission when the vehicle accelerates. Specifically, in such a vehicle the vehicle body is unable to keep pace with the rapid change in the output torque of the vehicle engine so that a torque phase lag arises. This produces twisting in the drive system for transmitting the output to the drive wheels, particularly in the drive shaft, which in turn produces vibration that not only adversely affects the feeling experienced by the operator during acceleration but also degrades the drivability.

SUMMARY OF THE INVENTION

An object of the present invention is therefore to provide an ignition timing control system for internal combustion engines for effectively eliminating vibration of the vehicle body during acceleration.

There is a certain time lag between the moment when the throttle valve is opened and the time that the engine speed increases to boost the engine output and increase the vehicle speed. Where the vehicle is equipped with a manual transmission and the operator should disengage the clutch in order to shift gears, then, if the operator clearly intends to accelerate by opening the throttle valve, the engine speed will generally decrease for a while and then after the clutch has been reengaged finally begin to increase again.

Another object of the invention is to provide such a system which controls the ignition timing during acceleration but which accurately detects the occurrence of accelerating states and initiates retard control from such time, thus improving the control accuracy so that the operator experiences a good sensation of acceleration and the occurrence of vehicle body vibration is prevented.

This invention achieves these objects by providing an ignition timing control system for internal combustion engines comprising a system for controlling an ignition timing of vehicle internal combustion engine, comprising a first device for detecting operating condition of the vehicle internal combustion engine, including engine speed, engine load and vehicle acceleration, a second device for determining a basic ignition timing of the vehicle engine on the basis of the detected engine speed and load, a third device for detecting the change in the engine speed, a fourth device for adjusting the basic ignition timing in the retard direction for a predetermined period when the vehicle acceleration is detected, the fourth device continues to adjust, after expiration of the period, the basic ignition timing in the retard direction as long as the engine speed is found to increase, and an ignition device for igniting air-fuel mixture on the basis of the adjusted ignition timing.

BRIEF EXPLANATION OF THE DRAWINGS

FIGS. 7($a$–$c$) are a waveform diagram for explaining the control operation according to the first embodiment of the invention.

DETAILED DESCRIPTION OF THE INVENTION

The invention will now be explained with reference to specific embodiments.

Figure 1:
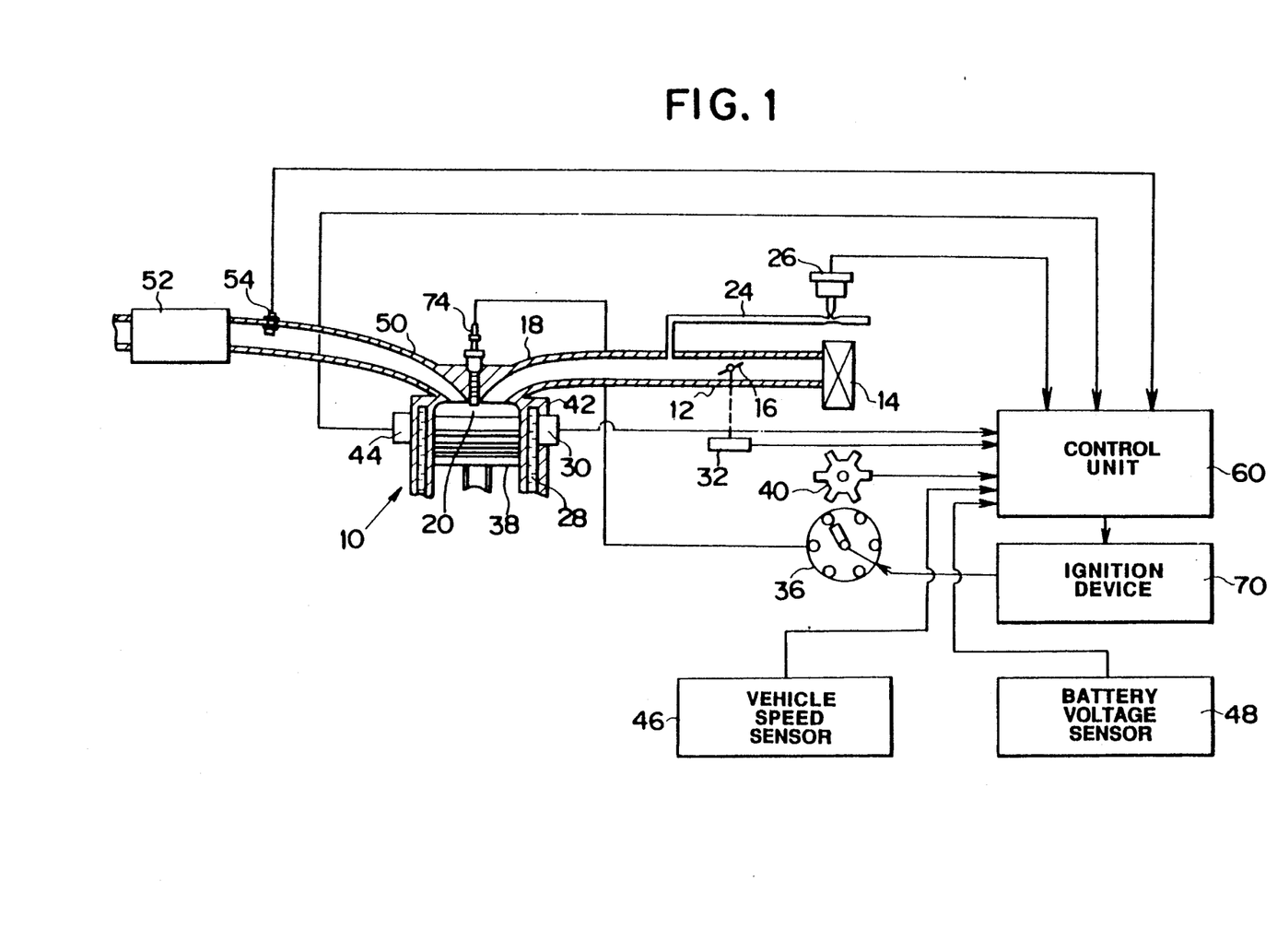
FIG. 1 is a schematic view of an ignition timing control system for internal combustion engines in accordance with this invention.

FIG. 1 shows the overall arrangement of an ignition timing control system for internal combustion engines in accordance with this invention. A six-cylinder vehicle internal combustion engine 10 (shown partially in schematic representation) has an air intake passage 12 provided at its distal end with an air cleaner 14 and at an intermediate portion thereof with a throttle valve 16. Air drawn in through the air cleaner 14 has its flow rate controlled by the throttle valve 16 and passes through an intake manifold 18 to the combustion chambers 20 (only one shown) of the engine cylinders. A pipe 24 branches off from the air intake passage 12 at an appropriate position downstream of the throttle valve 16. The pipe 24 is provided near its far end with a manifold absolute pressure sensor 26 which detects the engine load by measuring the absolute value of the intake air pressure. A coolant temperature sensor 30 is provided in the vicinity of a cooling water passage 28 of the internal combustion engine 10 for detecting the temperature of the engine cooling water and a manifold air temperature sensor (not shown) is provided at an appropriate position downstream of the throttle valve 16 for detecting the temperature of the air drawn into the engine. A throttle position sensor 32 is further provided at an appropriate position on the engine for detecting the degree of opening of the throttle valve 16.

The internal combustion engine 10 has a distributor 36 which includes a crankshaft sensor 40 comprised of a magnet which rotates in synchronism with a crankshaft (not shown) rotated by the reciprocal motion of pistons 38 and a stationary member disposed opposite the magnet. The crankshaft sensor 40 outputs a signal once every predetermined angle of crankshaft rotation. At an appropriate location on a cylinder block 42 of the internal combustion engine 10 is provided a piezoelectric detonation sensor 44 for detecting vibration produced by combustion knock arising within the combustion chambers 20, while at an appropriate portion of the vehicle there is provided a vehicle speed sensor 46 for detecting the speed at which the vehicle is traveling. The voltage of the battery (not shown) is further detected by an appropriately disposed battery voltage sensor 48. The exhaust passage 50 of the internal combustion engine 10 is provided with a three-way catalytic converter 52 for reducing the amount of pollutants in the exhaust gas before it is emitted into the atmosphere. Immediately upstream of the three-way catalytic converter 52 is provided an oxygen sensor 54 for detecting the oxygen concentration of the exhaust gas. The output of the manifold absolute pressure sensor 26 and the other sensors 30, 32, 40, 44, 46, 48 and 54 are forwarded to a control unit 60.

Figure 2:
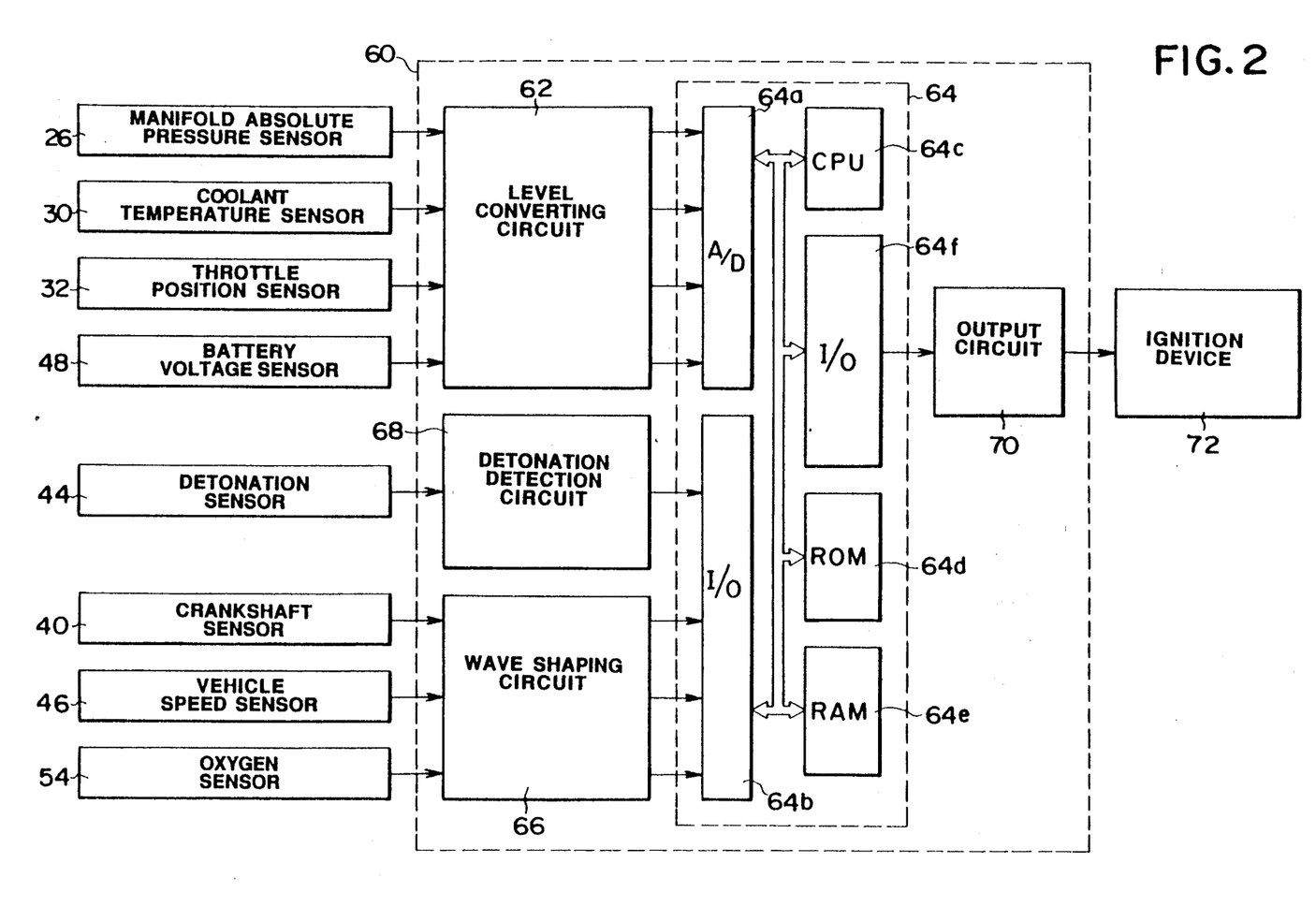
FIG. 2 is a block diagram showing details of the control unit of the system of FIG. 1.

The arrangement of the control unit 60 is illustrated in FIG. 2. The outputs from the manifold absolute pressure sensor 26 and the other sensors are input to a level converter 62 in the control unit 60 for adjustment to a prescribed level and are then forwarded to a microcomputer 64. The microcomputer 64 comprises an A/D converter 64a, an I/O circuits 64b,64f, a CPU (central processing unit) 64c, a ROM (read-only memory) 64d, a RAM (random access memory) 64e, a counter for computation and a timer (the two last mentioned members not being shown). The signals output by the level converter 62 are converted to digital values by the A/D converter 64a in accordance with commands from the CPU 64c and are then temporarily stored in the RAM 64e. The digital outputs of the crankshaft sensor 40 etc. are shaped in a wave shaping circuit 66 and then input to the microcomputer 64 through the I/O circuit 64b. After being sent to the control unit 60, the output from the detonation sensor 44 is input to a detonation detection circuit 68 where it is discriminated whether or not knock has occurred and the result of the discrimination is input to the microcomputer 64 via the I/O circuit 64b.

As will be explained in more detail later, the microcomputer 64 calculates the engine speed from the output of the crankshaft sensor 40, determines the engine load state from the output of the manifold absolute pressure sensor 26, retrieves a basic ignition timing map from the ROM 64d and uses the same for calculating a basic ignition timing, adjusts the basic ignition timing on the basis of the intake air temperature and other parameters, further adjusts the so-obtained ignition timing if engine knock has occurred thereby obtaining the final ignition timing and issues an ignition command via the I/O circuit 64f and an output circuit 70 to an igniter or other such ignition device 72, thereby causing a spark plug 74 of a prescribed cylinder selected by the distributor 36 to fire and ignite the air-fuel mixture in the associated combustion chamber 20.

Figure 3:
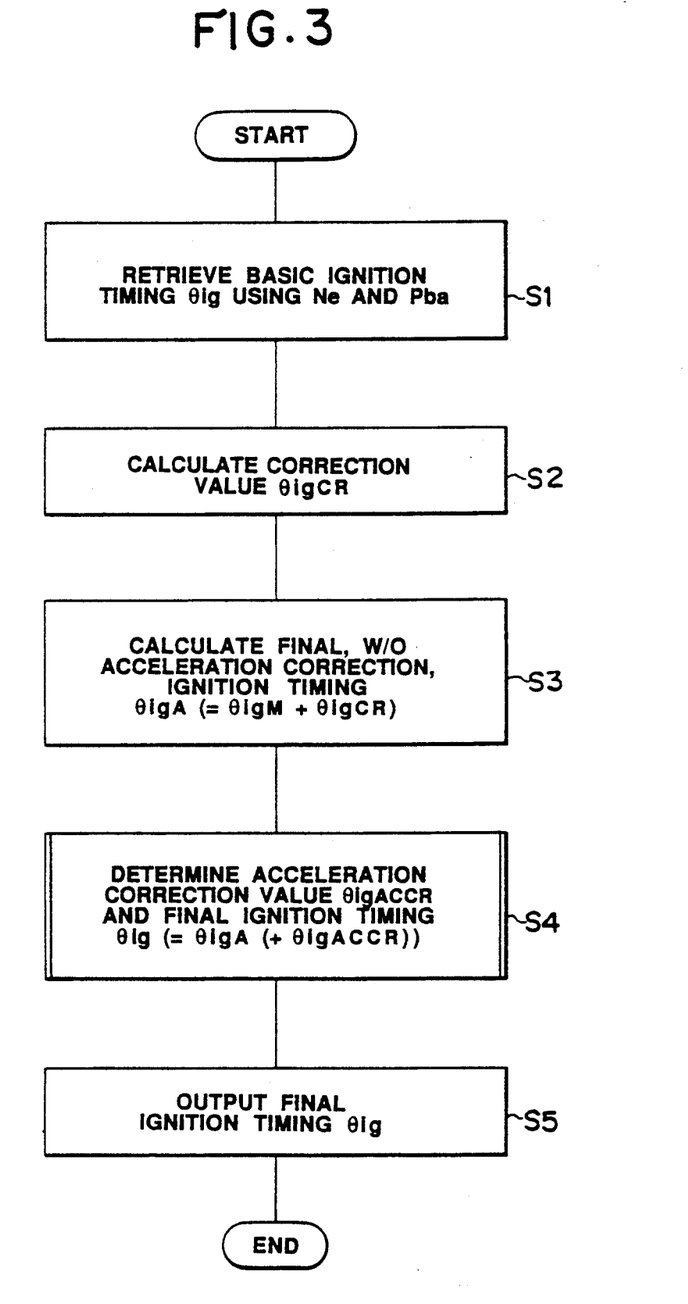
FIG. 3 is a flowchart showing the main routine of a program for operating the system according to this invention.
Figure 4:
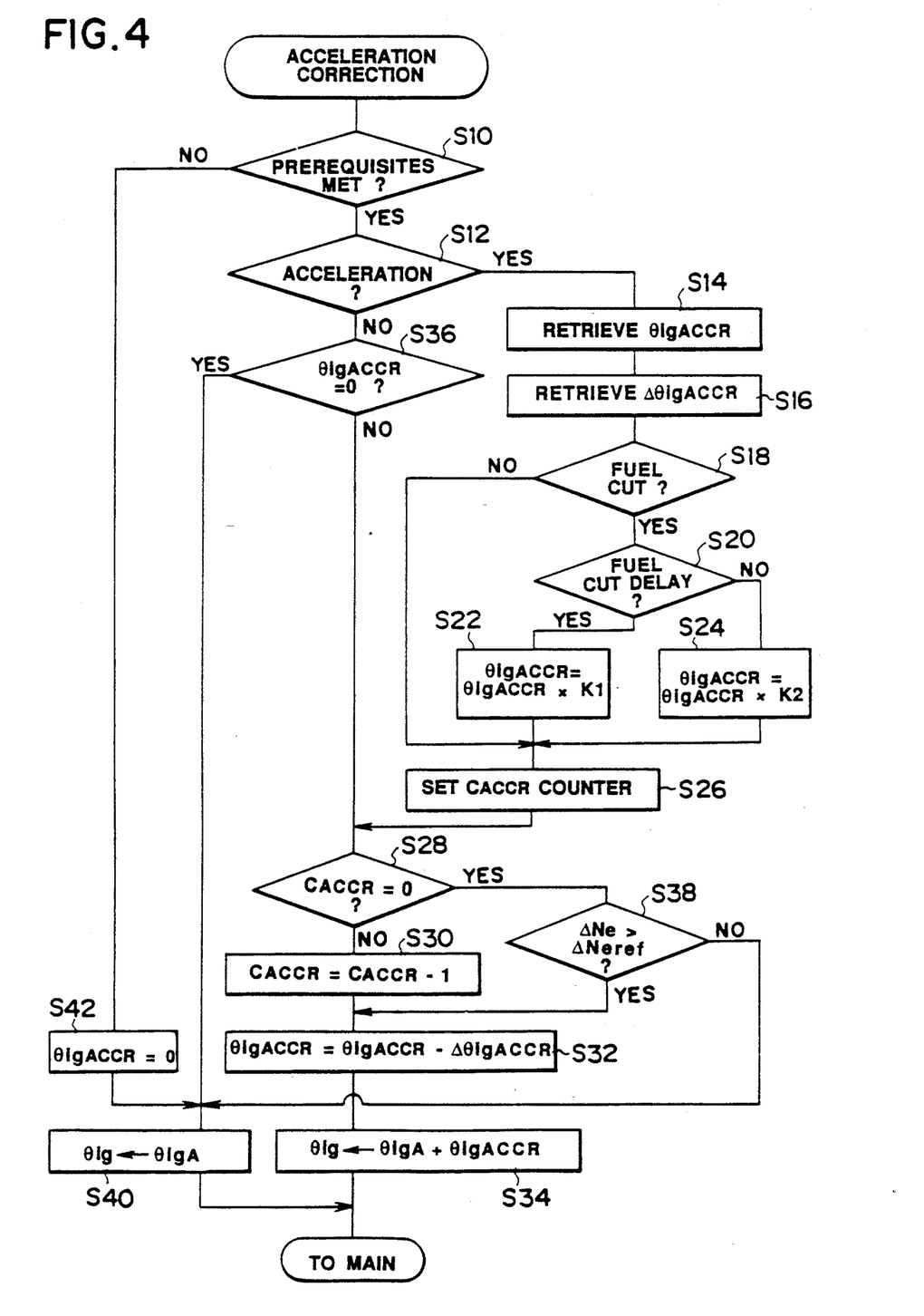
FIG. 4 is a flowchart showing an acceleration correction subroutine of the main routine of FIG. 3 according to the first embodiment of the invention.

The operation of the system will now be explained with reference to the flowcharts of FIGS. 3 and 4. The program shown in FIG. 3 is the main routine for the ignition timing control system according to this invention and is initiated in the microcomputer 64 once every prescribed crank angle. The flowchart of FIG. 4 shows a subroutine of this main routine. The control system of this invention is intended for use with an engine installed in a vehicle equipped with a manual transmission.

Referring to FIG. 3, the procedure begins with step S1 in which a basic ignition timing $\theta_{igM}$ is determined on the basis of a map value retrieved from the ROM 64d of the microcomputer 64 using the engine speed and the intake air pressure (engine load) as address data. Next, in step S2 a coolant temperature correction value is determined from the output of the coolant temperature sensor 30 etc., a knock correction value is determined from the output of the detonation detection circuit 68, and these, plus any other appropriate correction value other than the acceleration correction value are, as deemed necessary, combined to obtain a correction value $\theta_{igCR}$. The correction value $\theta_{igCR}$ can be either positive (indicating a timing adjustment in the advance direction) or negative (indicating a timing adjustment in the retard direction). The procedure then moves to step S3 in which the basic ignition timing and the correction value are added together to obtain an ignition timing corrected for all factors other than the acceleration (hereinafter called "ignition timing $\theta_{igA}$"). Then the procedure moves to step S4 in which the acceleration correction value $\theta_{igACCR}$ is determined in accordance with the subroutine of FIG. 4, whereafter the final ignition timing $\theta_{ig}$ is determined.

Figure 7:
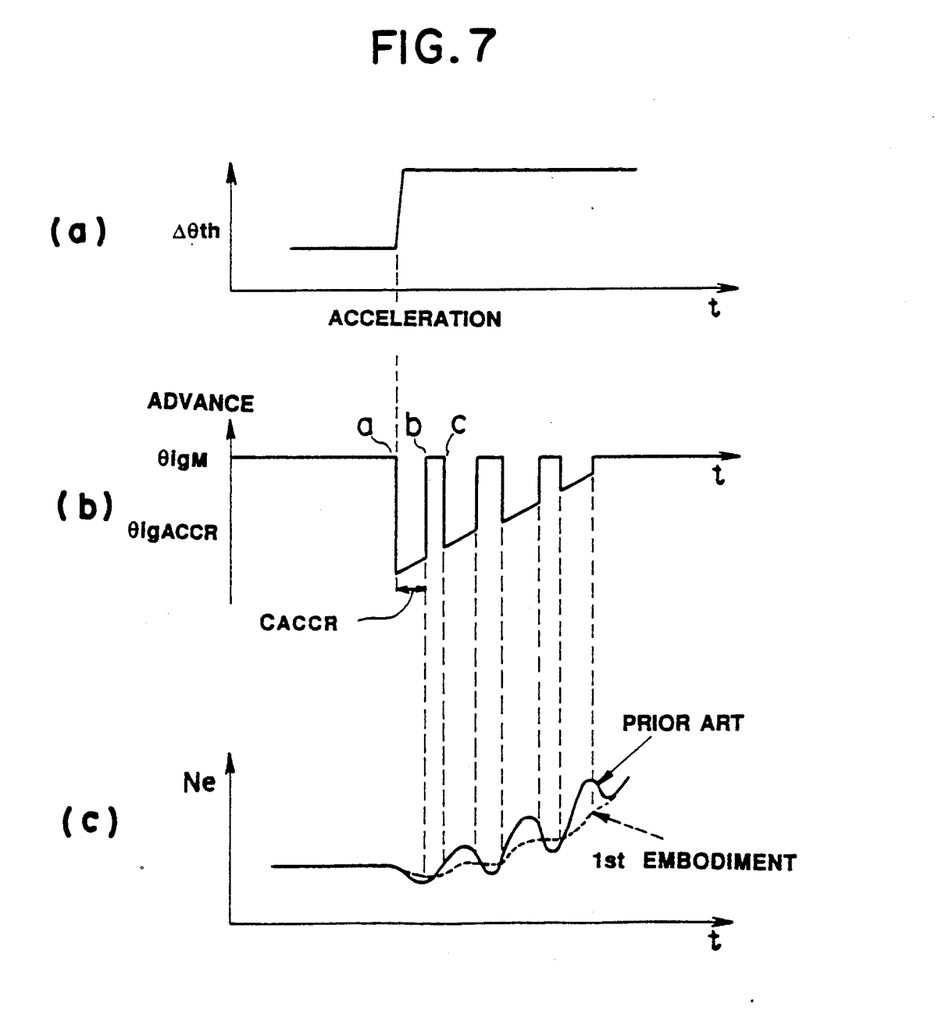

The acceleration correction value calculation routine will now be explained with reference to FIG. 4. The procedure starts with step S10 in which it is determined whether the prerequisites for acceleration correction are met. These prerequisites include, for example, that the battery voltage be at least a prescribed value, that engine warm-up has been completed, and that the vehicle speed and/or the engine speed are within prescribed ranges. When it is found in step S10 that the prerequisites are met, the procedure moves to step S12 in which it is confirmed whether the vehicle is in acceleration state. This is done by calculating the change of the throttle opening degrees Delta $\theta_{TH}$ per unit time or crank angle as shown in FIG. 7 and then by comparing the value with an appropriately set prescribed value.

Figure 5:
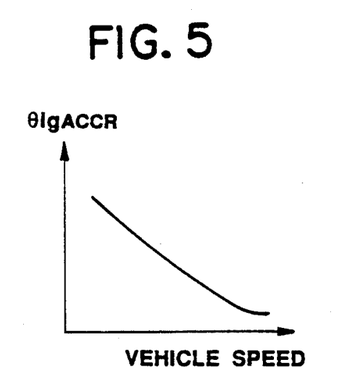
FIGS. 5 and 6 are graphs for explaining correction characteristics used in the subroutine of FIG. 4.
Figure 6:
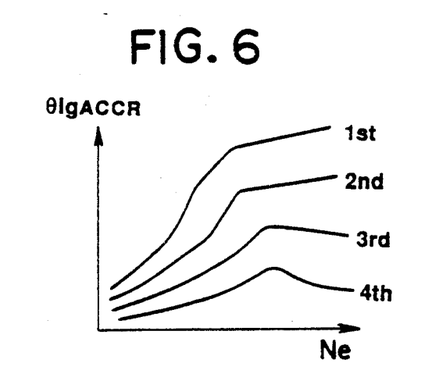

If the decision at step S12 is affirmative, the procedure then proceeds to step S14 in which the acceleration correction value $\theta_{igACCR}$ is retrieved from the ROM 64d using engine operating conditions as address data. FIG. 5 illustrates the correction value which is set with respect to vehicle speed. In the figure, the value is set to decrease as the vehicle speed increases, since the inertia moment decreases as the vehicle speed decreases and hence engine output should be reduced by greater amount as the speed decreases. FIG. 6 shows similar value which is determined with respect to engine speed and gear positions. The (initial) retard correction value is made proportional to the engine speed because the vehicle body vibration is caused by the inability of the body to keep pace with the output developed by the engine and the vibration caused by this phase lag becomes stronger as the engine speed increases, i.e., as the engine torque becomes larger. Further, since torque generated at the drive wheels decreases as the gear is shifted up, the degree of reduction is set to decreases as the higher gear is used. The characteristics depicted in these figures are stored in the memory and in step S14, the acceleration correction value is determined using either or both of the characteristics. The procedure then moves to step S16, where an attenuation unit value Delta $\theta_{igACCR}$ is determined. The unit value is a fixed value or may be a variable value.

The at step S18, a determination is made whether engine operation is in the fuel cut region. The fuel cut takes place when the throttle valve is fully closed, when the engine load is less than a predetermined value or when the vehicle is decelerating. The fuel cut is decided in a fuel injection control separately carried out in the microcomputer 64 so that the decision in this step is made by referring a flag in the computer indicating that fuel injection is cut. When the determination is affirmative in step S18, the procedure then moves to step S20 where it is confirmed whether the fuel cut is being delayed by referring to another flag and if so, the procedure moves to step S22 in which the acceleration correction value is multiplied by a constant $K_1$ (e.g 1.25), while if the decision is negative which means fuel is now being cut, the procedure advances to step S24 where the value is multiplied by another constant $K_2$ (e.g. 1.5). And if it is found that fuel is not being cut at step S18, the procedure jumps these steps. The reason to modify the value is that, the engine output torque differs among conditions whether fuel is being cut or not. More specifically, when the vehicle accelerates at the situation when fuel has been cut, the change in the engine output torque becomes large, which might cause the aforesaid vibration. And when fuel cut is being delayed, although fuel is being supplied, but is made lean so that the same problem could arise. Thus, the degree of engine output reduction is made greater in the fuel cut delay region than an ordinary region and is further made greater in the fuel cut region.

The procedure then moves to step S26 where a down counter $C_{ACCR}$ is started. This counter counts the number of combustions (ignitions) for which retard correction is initially conducted. The procedure advances, via step S28, to step S30 in which the counter is decremented. Then, the procedure moves to step S32 where the acceleration correction value $\theta_{igACCR}$ is subtracted by the unit value Delta $\theta_{igACCR}$. The subtraction means to amend the value in the advance direction. Then the procedure moves to step S34 where the acceleration correction value is added to the ignition timing $\theta_{igA}$ to determine final ignition timing $\theta_{ig}$. That is, the ignition timing is adjusted to retard by the value and the procedure moves to step S5 in FIG. 3 flowchart, in which the final ignition timing is output.

After the program has been restarted and answered as NO at step S12, the procedure advances to step S36 where it is confirmed if the value remains. The decision at this step will be negative so that the procedure moves to step S28 in which it is confirmed if the counter value has reached zero. If it is found NO, then the procedure moves to steps S32,S34 and S5 such that the ignition timing is continued to retard, while the degree of retard adjustment decreases as the procedure loops. When the counter value is found to reach zero at step S28, the procedure moves to step S38 where the change in the engine speed Delta $N_e$ per unit time is compared with a reference value Delta $N_{eref}$. When it is found at step S38 that the change of the engine speed exceeds the reference value, which means the engine speed is in the increasing direction, the procedure advances to step S32 in which the retard adjustment is resumed. On the other hand, when the engine speed is not found to be increasing, the procedure moves to step S40 in which the final ignition timing is determined without making the acceleration correction. Similarly, when the acceleration correction value is found to be zero at step S36, no correction is made (S40). And, when the prerequisites are not found to be met in step S10, the correction value, if any, is canceled at step S42 and the ignition timing is determined without the correction (S40).

The above will now be explained with reference to FIG. 7. When the acceleration is detected at point a through the change in the throttle valve as shown in (a) in the figure, the ignition timing is immediately retarded by the amount $\theta_{igACCR}$, as shown in (b) in the same figure. The retard adjustment will continue until the counter value $C_{ACCR}$ has reached zero, although the amount is decreased gradually by the unit Delta $\theta_{igACCR}$. When the counter value has reached zero at point b, the ignition timing is once restored to the initial basic value ($\theta_{igM}$), unless the engine speed increases. (For ease of understanding, the correction value $\theta_{igCR}$ is omitted from consideration.) Then, if the engine speed is found to turn in the increasing direction at point c, the retard adjustment is resumed from the amount slightly lesser than that interrupted earlier and similar procedure goes on until the amount $\theta_{igACCR}$ has reached zero. More specifically, retard control is conducted only when the engine speed is rising and the ignition timing is returned to the basic ignition timing when the engine speed is decreasing. As a result of these repeated ignition timing control, the overall ignition timing characteristics take on a zigzag pattern. In other words, the ignition timing is controlled to reduce the output torque when the torque tends to rise because the engine speed is rising, while the retard correction is discontinued so as to prevent a decrease in output torque when the output torque tends to decline. By deliberately imparting a phase difference to the output in this way, the engine speed can be made to rise smoothly as indicated by the engine speed characteristics represented by a chain line in (c) in FIG. 7. As a result, the output torque can be smoothly increased, in contrast with the prior art, thus preventing not only knock but also vibration and ensuring stable operation so that the passenger experiences a smooth acceleration sensation.

Figure 8:
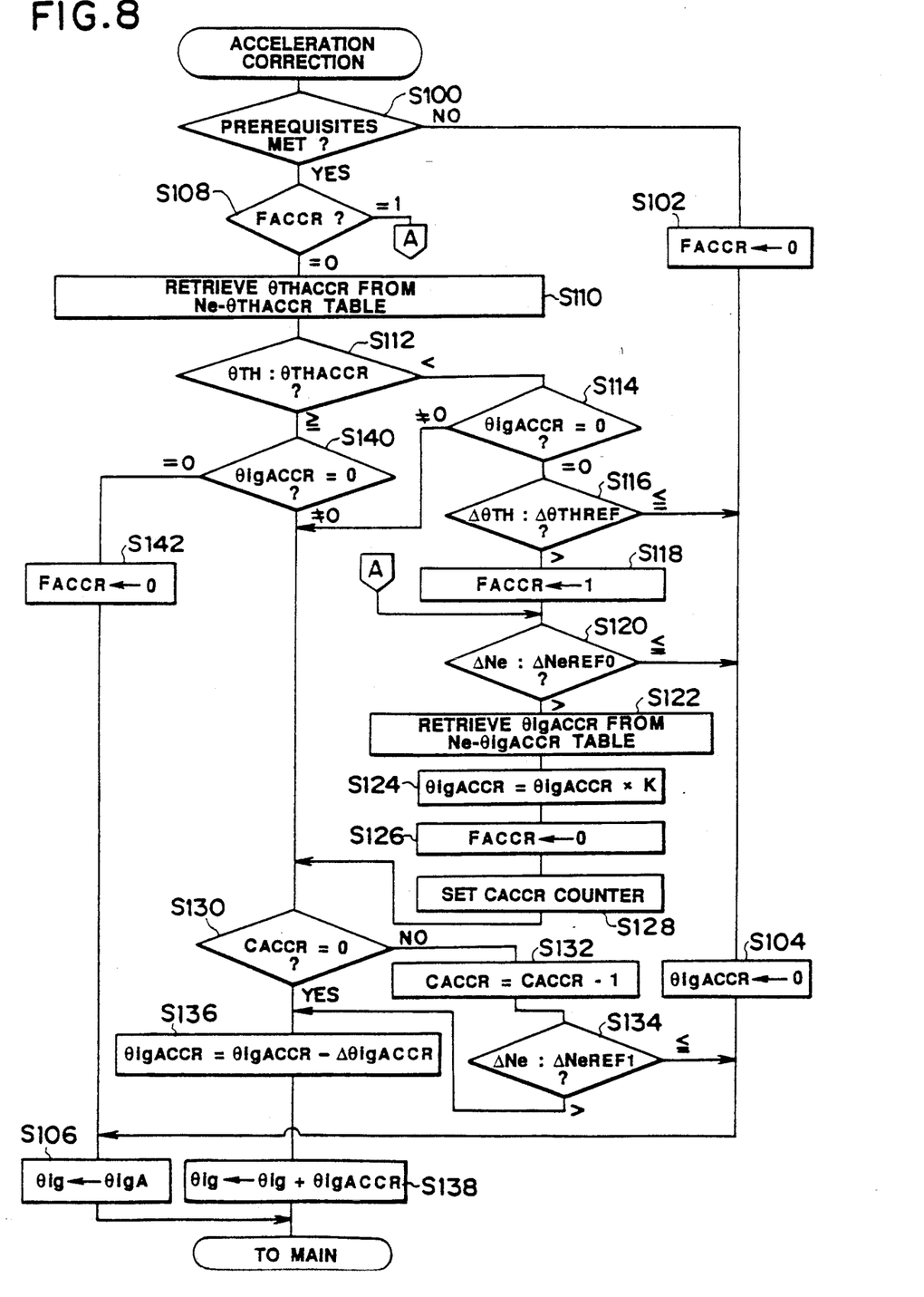
FIG. 8 is a flowchart showing another acceleration correction subroutine of the main routine of FIG. 3 according to the second embodiment of the present invention.

FIG. 8 shows another acceleration correction value calculation according to the second embodiment of the invention. First in step S100, it is determined whether the prerequisites are met and when it is found not, the procedure moves to step S102 in which a flag $F_{ACCR}$ (to be explained later) is turned off, to step S104 in which the acceleration correction value $\theta_{igACCR}$ is made zero, and to step S106 in which the uncorrected value $\theta_{igA}$ is used as the ignition timing $\theta_{ig}$.

Figure 9:
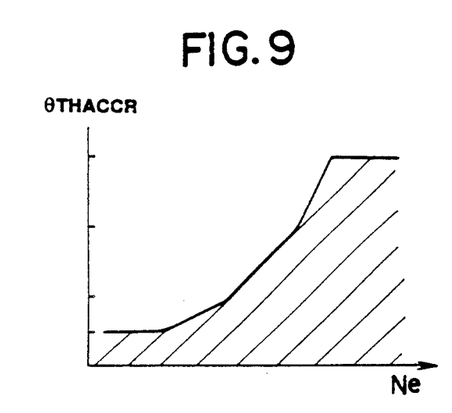
FIG. 9 is a graph for explaining throttle valve opening characteristics used in the subroutine of FIG. 8.

If the prerequisites are found to be met in step S100, the procedure advances to step S108 in which it is determined whether or not the flag $F_{ACCR}$ is on. During the first program cycle of operation, this flag is not on and the procedure moves to step S110 in which a value $\theta_{THACCR}$ is retrieved from a throttle valve opening characteristic table $N_e - \theta_{THACCR}$. These characteristics are illustrated in FIG. 9. As can be seen, the throttle valve opening is set as a function of the engine speed $N_e$. The values of this table are stored in the ROM 64d so as to be retrievable using the engine speed as address data. More specifically, since the acceleration that is apt to give rise to vibration is that from the low load side, the throttle valve openings requiring control in accordance with the engine speed can be anticipated in advance to be those falling within the hatched region of FIG. 9. The procedure then advances to step S112 in which it is determined whether or not the throttle valve opening $\theta_{TH}$ detected is equal to or smaller than the control initiation opening $\theta_{THACCR}$ just retrieved for the same engine speed and if it is confirmed that the value $\theta_{TH}$ is smaller than the value $\theta_{THACCR}$, the procedure moves to step S114.

In step S114 it is determined whether or not any of the acceleration correction value $\theta_{igACCR}$ remains. In the first program cycle it is of course found to equal zero so that the procedure moves to step S116 where it is determined whether or not the change in the throttle valve opening per unit time (or angle) Delta $\theta_{TH}$ is greater than an appropriately set predetermined value Delta $\theta_{THREF}$. As this predetermined value there is selected one sufficient for discriminating throttle valve (accelerator pedal) depression rates at which acceleration correction becomes necessary. When it is found in step S116 that the rate of throttle valve opening exceeds the predetermined value, the procedure moves to step S118 in which the aforesaid flag $F_{ACCR}$ is turned on. The ON state of this flag indicates entry into the control region.

In the following step S120 it is determined whether or not the change in engine speed per unit time Delta $N_e$ is greater than an appropriately set reference value Delta $N_{eREF0}$. This reference value is for confirming whether or not, under the conditions shown in FIG. 11, the engine speed has stopped its descent and begun to ascend again, i.e an actual acceleration state has taken place, and it can be set at an appropriate value suitable for this purpose. If it is found in step S120 that Delta $N_e$ is smaller than this reference value, i.e. if the engine speed has not begun to increase yet, no acceleration correction is conducted and the procedure reverts to the main routine of FIG. 3 through steps S104, S106, whereafter a command is issued in step S5 for ignition at a time uncorrected for acceleration. The same will also be applied when the rate is found to be equal to or smaller than the predetermined value at S116. At the beginning of the next cycle, the flag is found to be on so that the procedure jumps to step S120 and the same loop is repeated until it is determined in step S120 that the engine speed has begun to rise.

Figure 10:
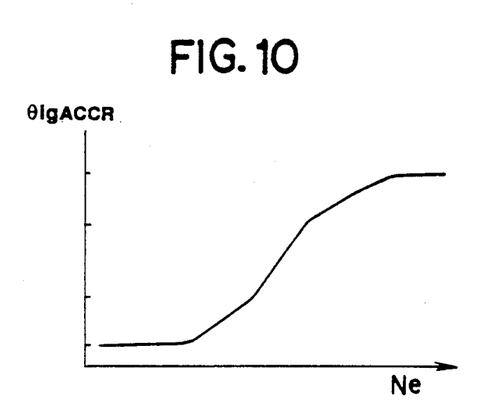
FIG. 10 is a graph for explaining correction characteristics used in the subroutine of FIG. 8.

After the program has been restarted some number of times and it is found in step S120 that the engine speed has hit bottom and begun to increase, the procedure advances to step S122 in which an acceleration correction value $\theta_{igACCR}$ is retrieved from a retard correction table $N_e - \theta_{igACCR}$, whereby the (initial) retard correction value is set. The characteristics of the retard correction value are shown in FIG. 10, from which it will be understood that the (initial) retard correction value increases in proportion as the engine speed increases, just like as that explained with reference to FIG. 6. These characteristics are organized in tabular form and stored in the ROM 64d so as to be retrievable using the engine speed as address data.

The procedure then moves to step S124 in which the retrieved correction value is adjusted by multiplication by an appropriate coefficient K, to step S126 in which the flag is turned off, and then to step S128 in which the counter $C_{ACCR}$ is set. The procedure then advances through step S130 to step S132 in which the count value is decremented. In the following step 134, the rate of change in the engine speed Delta $N_e$ is compared with an appropriately set second reference value Delta $N_{eREF1}$, whereby it is reconfirmed whether the engine speed continues to increase. Since a similar comparison was just made in step S120, the result in step S134 will be affirmative so that the procedure moves on to step S136 in which the acceleration correction value $\theta_{igACCR}$ is reduced by the attenuation unit value Delta $\theta_{igACCR}$ and the result is added to the ignition time in step S138, whereafter a command is issued (S5 in FIG. 3).

Once retard control has been initiated, the flag will be found to be off in step S108 at the beginning of the next program cycle so that the degree of throttle valve opening will again be determined in step S112. Since it is normal in an accelerating state for depression of the accelerator pedal to continue and thus for the throttle valve to remain open, the throttle valve opening is found to be equal to or larger than the prescribed value in step S112. Thus the procedure advances to step S140 in which it is determined whether or not the retard correction amount has been attenuated to zero. As the result in step S140 is naturally negative, the procedure goes to step S130 and retard correction is continued in step S138 along with progressive attenuation in step S136, so long as it is in step S134 confirmed, up to the time that the counter value is found to have become zero, that the engine speed is on the rise.

After the program has been repeated a number of cycles and it is found in step S140 that the acceleration correction value has become zero, the procedure moves to step S142 in which the flag is turned off (if on at that time) and then to step S106 in which ignition timing unadjusted for acceleration for is implemented.

Figure 11:
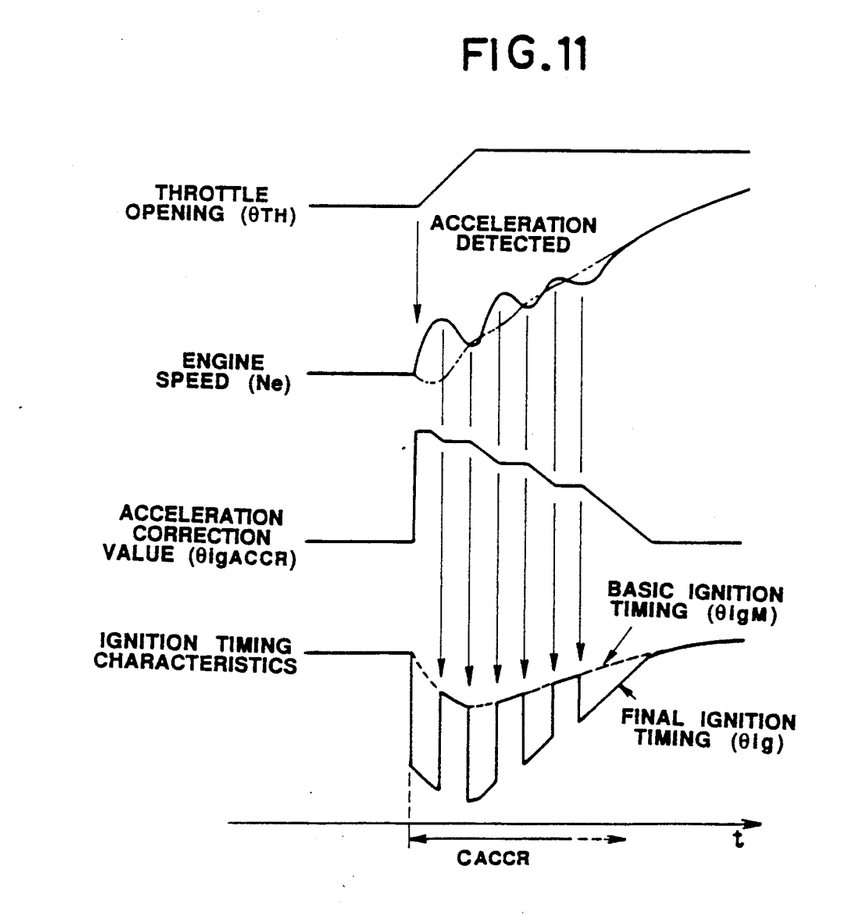
FIG. 11 is a waveform diagram for explaining the control operation according to the second embodiment of this invention.

FIG. 11 shows the control according to the second embodiment. It will be understood from the figure that the torque fluctuations during acceleration are averaged out so that the quality of the acceleration feeling is enhanced and vibration is reduced to provide better drivability. Here, the counter $C_{ACCR}$ is used in the different manner from that in the first embodiment. The counter value defines the period during which ignition timing is retarded every time engine speed is found to increase (S130,132,134,136,138). After the expiration of the period, the acceleraton correction value $\theta_{igACCR}$, if remains, will be continually decreased even when the engine speed decreases (S140, 130,136,138).

Figure 12:
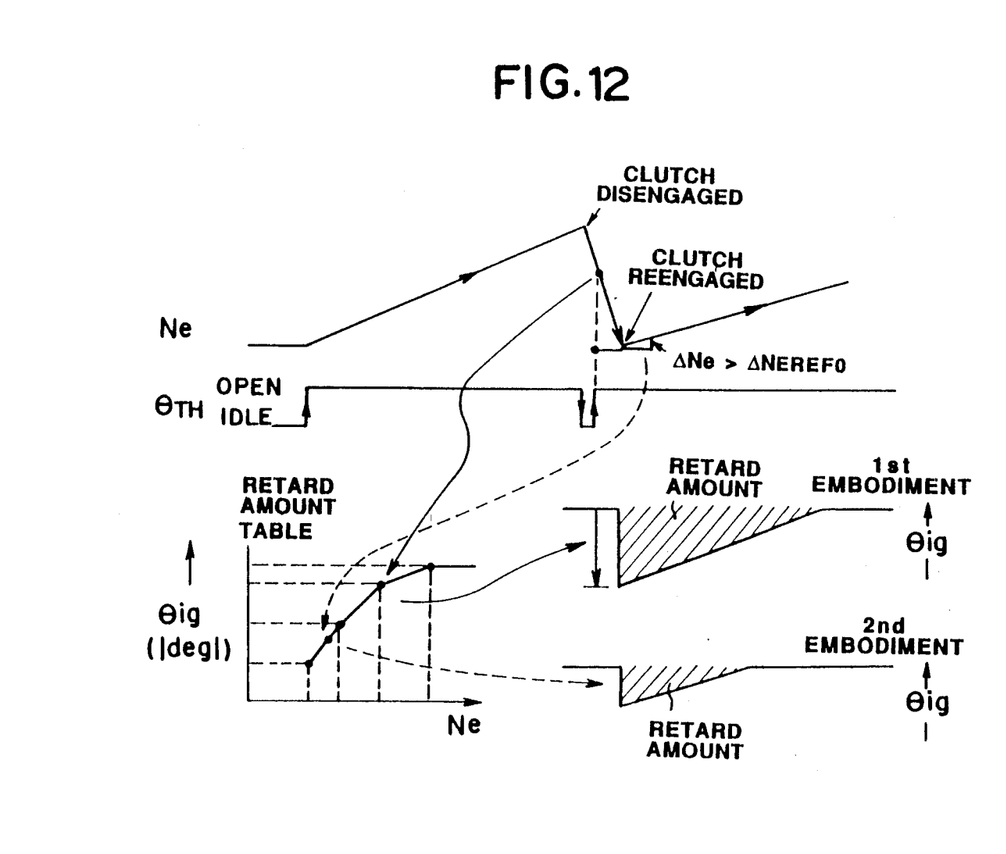
FIG. 12 is a diagram for explaining how the first and second embodiments differ in the nature of the control as regards the engine speed during gear shift operation.

FIG. 12 illustrates the difference between the first and second embodiments. As was mentioned earlier, there is a certain time lag between moment when the throttle valve is opened and the time the engine speed increases to boost the engine output and increase the vehicle speed. In the system described in the first embodiment, the amount of retard adjustment is determined as a function of the engine speed in accordance with the vehicle speed or the gear position. Where it is determined as a function of the engine speed, however, if the vehicle is equipped with a manual transmission and the driver should disengage the clutch in order to shift gears, then, as shown in FIG. 12, even if the operator's clear intention is to accelerate by opening the throttle valve, the engine speed will generally decrease for a while and then after the clutch has been reengaged finally begin to increase again. Therefore, if the state of acceleration is determined from the change in the degree of throttle opening and the amount of retard adjustment is determined as a function of the engine speed as was experienced in the first embodiment, the amount of the adjustment will be, in some cases, excessive, which will have the undesired effect of reducing the acceleration. In the second embodiment, on the other hand, retard control is initiated from the time that acceleration actually begins. As such, the determination of the retard correction value from the engine speed is made in such a manner as to avoid excessive corrections.

Figure 13:
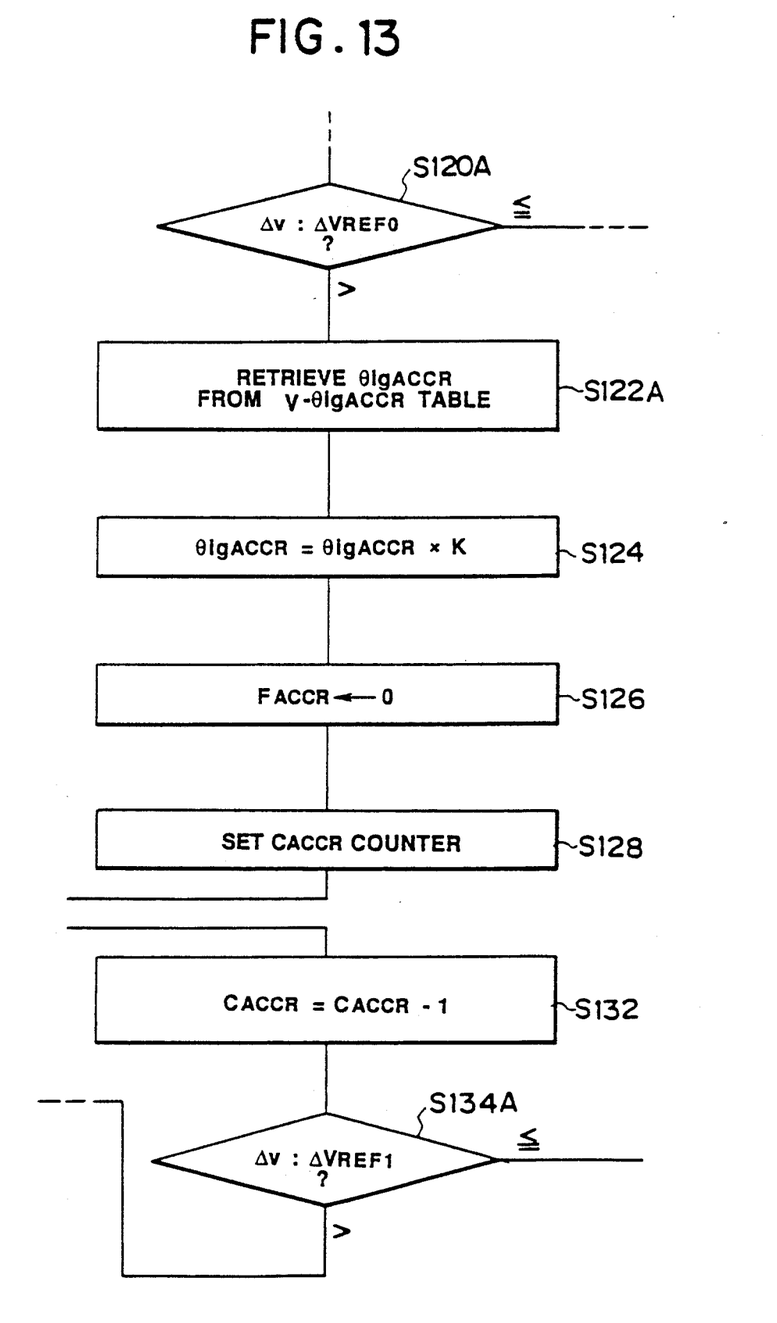
FIG. 13 is a flowchart showing still another acceleration correction subroutine of the main flowchart of FIG. 3 according to the third embodiment of the present invention.

FIG. 13 is a flowchart showing still another acceleraton correction subroutine according to the third embodiment of the invention. The only difference between the second and third embodiments of invention is that the concurrence of the actual acceleration state is detected from the vehicle speed (S120A,122A,134A). The rest are quite the same as those in the second embodiment.

While in the second and third embodiments, the reference values used in steps S120(120A), S134(134A) can be the same or different.

While in the aforesaid first, second and third embodiments the period of retard correction is measured in terms of the counted number of combustion cycles (TDCs), it can alternatively be measured in terms of time by a timer.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an ignition timing of a vehicle internal combustion engine, comprising:
    first means for detecting operating conditions of the vehicle internal combustion engine, including engine speed, engine load and vehicle acceleration;
    second means for determining a basic ignition timing of the vehicle engine based on detected engine speed and load;
    third means for detecting a change in the engine speed;
    fourth means for adjusting the basic ignition timing in a retard direction for a predetermined period by an amount which is set to attenuate with respect to time when the vehicle acceleration is detected, the fourth means continues to adjust, after an expiration of the predetermined period, the basic ignition timing in the retard direction by an amount smaller than a last attenuated amount in the predetermined period only when the engine speed is found to increase; and
    ignition means for igniting an air-fuel mixture based on the adjusted ignition timing.

2. A system according to claim 1, wherein said fourth means discontinues the retard adjustment when the engine speed is not found to increase and resumes the retard adjustment, when the engine speed is found to again increase by an amount not more than at a timing a preceding retard adjustment was discontinued.

3. A system according to claim 1, wherein an initial value of said amount is set to vary depending on the vehicle engine operating conditions.

4. A system according to claim 1, wherein an initial value of said amount is set to increase as the engine speed increases.

5. A system according to claim 1, wherein an initial value of said amount is set to increase as the engine speed increases and as a transmission gear is shifted down.

6. A system according to claim 1, wherein an initial value of said amount is set to decrease as the vehicle speed increases.

7. A system according to claim 1, wherein an initial value of said amount is made greater in a region where fuel is cut than in other regions.

8. A system according to claim 6, wherein the initial value of said amount is made greater in a region where fuel cut is being delayed than in the other regions.

9. A system according to claim 8, wherein the initial value of said amount is made greater in the fuel cut region than that in the fuel cut delayed region.

10. A system according to any of preceding claims 1, 2-8 or 9, wherein said first means detect the acceleration through a change in opening degree of a throttle valve.

11. A system for controlling an ignition timing of a vehicle internal combustion engine, comprising:
    first means for detecting operating conditions of the vehicle internal combustion engine, including engine speed, and engine load;
    second means for determining a basic ignition timing of the vehicle engine based on detected engine speed and load;
    third means for detecting a driver's intention to accelerate the vehicle;
    fourth means for adjusting the basic ignition timing in a retard direction when occurrence of an actual vehicle acceleration is detected after the driver's intention has been detected, the fourth means for discontinuing a retard adjustment when the engine speed is not found to increase and for resuming the retard adjustment, when the engine speed is found to again increase, by an amount not more than at a time a preceding retard adjustment was discontinued; and
    ignition means for igniting an air-fuel mixture based on the adjusted ignition timing.

12. A system according to claim 11, wherein said third means detects the driver's intention through a change in an opening degree at a throttle valve and said fourth means detects an occurrence of the actual vehicle acceleration through a change in the engine speed.

13. A system for controlling an ignition timing of a vehicle internal combustion engine, comprising:
    first means for detecting operating conditions of the vehicle internal combustion engine, including engine speed, engine load and vehicle acceleration;
    second means for determining a basic ignition timing of the vehicle engine based on detected engine speed and load;
    third means for detecting a change in the engine speed;
    fourth means for adjusting the basic ignition timing in a retard direction for a predetermined period every time the engine speed is found to increase when the vehicle is found to accelerate from an engine load state less than a predetermined level, the fourth means for carrying out a retard adjustment by an amount which is set to gradually attenuate with respect to time in the predetermined period; and ignition means for igniting an air-fuel mixture based on the adjusted ignition timing.

14. A system according to claim 13, wherein said engine load level is set with respect to the engine speed.

15. A system according to claim 13, wherein said fourth means adjusts the basic ignition timing in the retard direction for the predetermined period every time the engine speed is found to increase when the vehicle is found to accelerate, and the fourth means restores the basic ignition timing after the predetermined period has expired.

16. A system according to claim 13, wherein said fourth means discontinues adjustment of the basic ignition timing in the retard direction when the engine speed is not found to increase and resumes the retard adjustment, when the engine speed is found to again increase, by the amount not more than at a time a preceding retard adjustment was discontinued.

17. A system according to any of preceding claims 13, 14, 15 or 16, wherein an initial value of an amount of adjustment of said basic ignition timing is set to increase as the engine speed increases.

18. A system according to claims 13, 14, 15 or 16, wherein said first means detects the acceleration through a change in an opening degree of a throttle valve and change in the engine speed.

19. A system according to claims 13, 14, 15 or 16, wherein said first means detects the acceleration through a change in an opening degree of a throttle valve and change in the vehicle speed.

20. A system for controlling an ignition timing of a vehicle internal combustion engine, comprising:

first means for detecting operating conditions of the vehicle internal combustion engine, including engine speed, engine load and vehicle acceleration;

second means for determining a basic ignition timing of the vehicle engine based on detected engine speed and load;

third means for detecting a change in the engine speed;

fourth means for adjusting the basic ignition timing in a retard direction for a predetermined period by an amount which is set to attenuate with respect to time when the vehicle acceleration is detected, the fourth means continues to adjust, after an expiration of the predetermined period, the basic ignition timing in the retard direction as long as the engine speed is found to increase, said fourth means discontinues adjustment of the basic ignition timing in the retard direction when the engine speed is not found to increase and resumes the retard adjustment, when the engine speed is found to again increase by an amount not more than at a timing a preceding retard adjustment was discontinued; and ignition means for igniting an air-fuel mixture based on the adjusted ignition timing.

21. A system for controlling an ignition timing of a vehicle internal combustion engine, comprising:

first means for detecting operating conditions of the vehicle internal combustion engine, including engine speed, engine load and vehicle acceleration;

second means for determining a basic ignition timing of the vehicle engine based on detected engine speed and load;

third means for detecting a change in the engine speed;

fourth means for adjusting the basic ignition timing in a retard direction for a predetermined period by an amount which is set to attenuate with respect to time when the vehicle acceleration is detected, an initial value of said amount is made greater in a region where fuel is cut than in other regions, the fourth means continues to adjust, after an expiration of the predetermined period, the basic ignition timing in the retard direction as long as the engine speed is found to increase; and ignition means for igniting an air-fuel mixture based on the adjusted ignition timing.

22. A system for controlling an ignition timing of a vehicle internal combustion engine, comprising:

first means for detecting operating conditions of the vehicle internal combustion engine, including engine speed, engine load and vehicle acceleration;

second means for determining a basic ignition timing of the vehicle engine based on detected engine speed and load;

third means for detecting a change in the engine speed;

fourth means for adjusting the basic ignition timing in a retard direction for a predetermined period by an amount which is set to attenuate with respect to time when the vehicle acceleration is detected, an initial value of said amount is made greater in a region where fuel cut is being delayed than in other regions, the fourth means continues to adjust, after an expiration of the predetermined period, the basic ignition timing in the retard direction as long as the engine speed is found to increase; and ignition means for igniting an air-fuel mixture based on the adjusted ignition timing.

23. A system according to any of preceding claims 20, 21 or 22, wherein said first means detects the acceleration through a change in opening degree of a throttle valve.

24. A system for controlling an ignition timing of a vehicle internal combustion engine, comprising:

first means for detecting operating conditions of the vehicle internal combustion engine, including engine speed, and engine load;

second means for determining a basic ignition timing of the vehicle engine based on detected engine speed and load;

third means for detecting a driver's intention to accelerate the vehicle, said third means detects the driver's intention through a change in an opening degree at a throttle valve;

fourth means for adjusting the basic ignition timing in a retard direction when occurrence of an actual vehicle acceleration is detected after the driver's intention has been detected, said fourth means detects an occurrence of the actual vehicle acceleration through a change in the engine speed, said fourth means adjusts the basic ignition timing in the retard direction every time the engine speed is found to increase when the vehicle is found to accelerate from the engine load state less than a predetermined engine load level, said predetermined engine load level is set with respect to the engine speed; and ignition means for igniting an air-fuel mixture based on the adjusted ignition timing.

25. A system for controlling an ignition timing of a vehicle internal combustion engine, comprising:
- first means for detecting operating conditions of the vehicle internal combustion engine, including engine speed, engine load and vehicle acceleration;
- second means for determining a basic ignition timing of the vehicle engine based on detected engine speed and load;
- third means for detecting a change in the engine speed;
- fourth means for adjusting the basic ignition timing in a retard direction every time the engine speed is found to increase when the vehicle is found to accelerate, said fourth means adjusts the basic ignition timing in the retard direction every time the engine speed is found to increase when the vehicle is found to accelerate from the engine load state less than a predetermined engine load level, said predetermined engine load level is set with respect to the engine speed; and
- ignition means for igniting an air-fuel mixture based on the adjusted ignition timing.

26. A system for controlling an ignition timing of a vehicle internal combustion engine, comprising:
- first means for detecting operating conditions of the vehicle internal combustion engine, including engine speed, and engine load;
- second means for determining a basic ignition timing of the vehicle engine based on detected engine speed and load;
- third means for detecting a driver's intention to accelerate the vehicle, said third means detects the driver's intention through a change in an opening degree at a throttle valve;
- fourth means for adjusting the basic ignition timing in a retard direction when occurrence of an actual vehicle acceleration is detected after the driver's intention has been detected, said fourth means detects an occurrence of the actual vehicle acceleration through a change in the engine speed, said fourth means adjusts the basic ignition timing in the retard direction by an amount which is set to attenuate with respect to time, said fourth means discontinues adjustment of the basic ignition timing in the retard direction when the engine speed is not found to increase and resumes the retard adjustment, when the engine speed is found to again increase, by the amount not more than at a time a preceding retard adjustment was discontinued; and
- ignition means for igniting an air-fuel mixture based on the adjusted ignition timing.

27. A system for controlling an ignition timing of a vehicle internal combustion engine, comprising:
- first means for detecting operating conditions of the vehicle internal combustion engine, including engine speed, and engine load;
- second means for determining a basic ignition timing of the vehicle engine based on detected engine speed and load;
- third means for detecting a driver's intention to accelerate the vehicle;
- fourth means for adjusting the basic ignition timing in a retard direction when occurrence of an actual vehicle acceleration is detected after the driver's intention has been detected, said fourth means adjusts the basic ignition timing in the retard direction by an amount which is set to attenuate with respect to time, said fourth means discontinues adjustment of the basic ignition timing in the retard direction when the engine speed is not found to increase and resumes the retard adjustment, when the engine speed is found to again increase, by the amount not more than at a time a preceding retard adjustment was discontinued; and
- ignition means for igniting an air-fuel mixture based on the adjusted ignition timing.

28. A system for controlling an ignition timing of a vehicle internal combustion engine, comprising:
- first means for detecting operating conditions of the vehicle internal combustion engine, including engine speed, engine load and vehicle acceleration;
- second means for determining a basic ignition timing of the vehicle engine based on detected engine speed and load;
- third means for detecting a change in the engine speed;
- fourth means for adjusting the basic ignition timing in a retard direction every time the engine speed is found to increase when the vehicle is found to accelerate, said fourth means adjusts the basic ignition timing in the retard direction by an amount which is set to attenuate with respect to time, said fourth means discontinues adjustment of the basic ignition timing in the retard direction when the engine speed is not found to increase and resumes the retard adjustment, when the engine speed is found to again increase, by the amount not more than at a time a preceding retard adjustment was discontinued; and
- ignition means for igniting an air-fuel mixture based on the adjusted ignition timing.

* * * * *